United States Patent
Selker et al.

(10) Patent No.: US 6,614,421 B1
(45) Date of Patent: *Sep. 2, 2003

(54) KEYBOARD HAVING BUTTONS POSITIONED FOR OPERATION BY HEEL OF HAND

(75) Inventors: Edwin Joseph Selker, Palo Alto, CA (US); Barton Allen Smith, Campbell, CA (US); Todd Clossen Wyant, Morgan Hill, CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/083,680

(22) Filed: May 22, 1998

(51) Int. Cl.[7] .................................................. G09G 5/00
(52) U.S. Cl. ........................ 345/168; 345/157; 345/167; 341/21; 341/22
(58) Field of Search .................................. 345/160, 161, 345/167, 168, 157; 341/22, 21

(56) References Cited

U.S. PATENT DOCUMENTS

| | | | | |
|---|---|---|---|---|
| 5,269,004 A | * | 12/1993 | Comerford et al. | 345/168 |
| 5,360,280 A | * | 11/1994 | Camacho et al. | 345/168 |
| 5,438,331 A | * | 8/1995 | Gilligan et al. | 345/168 |
| 5,469,160 A | * | 11/1995 | Yang | 345/168 |
| 5,563,629 A | * | 10/1996 | Caprara | 345/160 |
| 5,914,702 A | * | 6/1999 | Derocher et al. | 345/168 |
| 5,936,555 A | * | 8/1999 | Zagnoev | 345/168 |
| 6,046,728 A | * | 4/2000 | Hume et al. | 345/157 |

* cited by examiner

Primary Examiner—Richard Hjerpe
Assistant Examiner—Kimnhung Nguyen
(74) Attorney, Agent, or Firm—Robert Buckley; Daniel E. Johnson

(57) ABSTRACT

A computer input device including a keyboard with built in pointing device, and left- and right-pointer control buttons operable by the thumbs includes additional left- and right-pointer control buttons located to each side for easy operation by the outer edge of the hands.

13 Claims, 3 Drawing Sheets

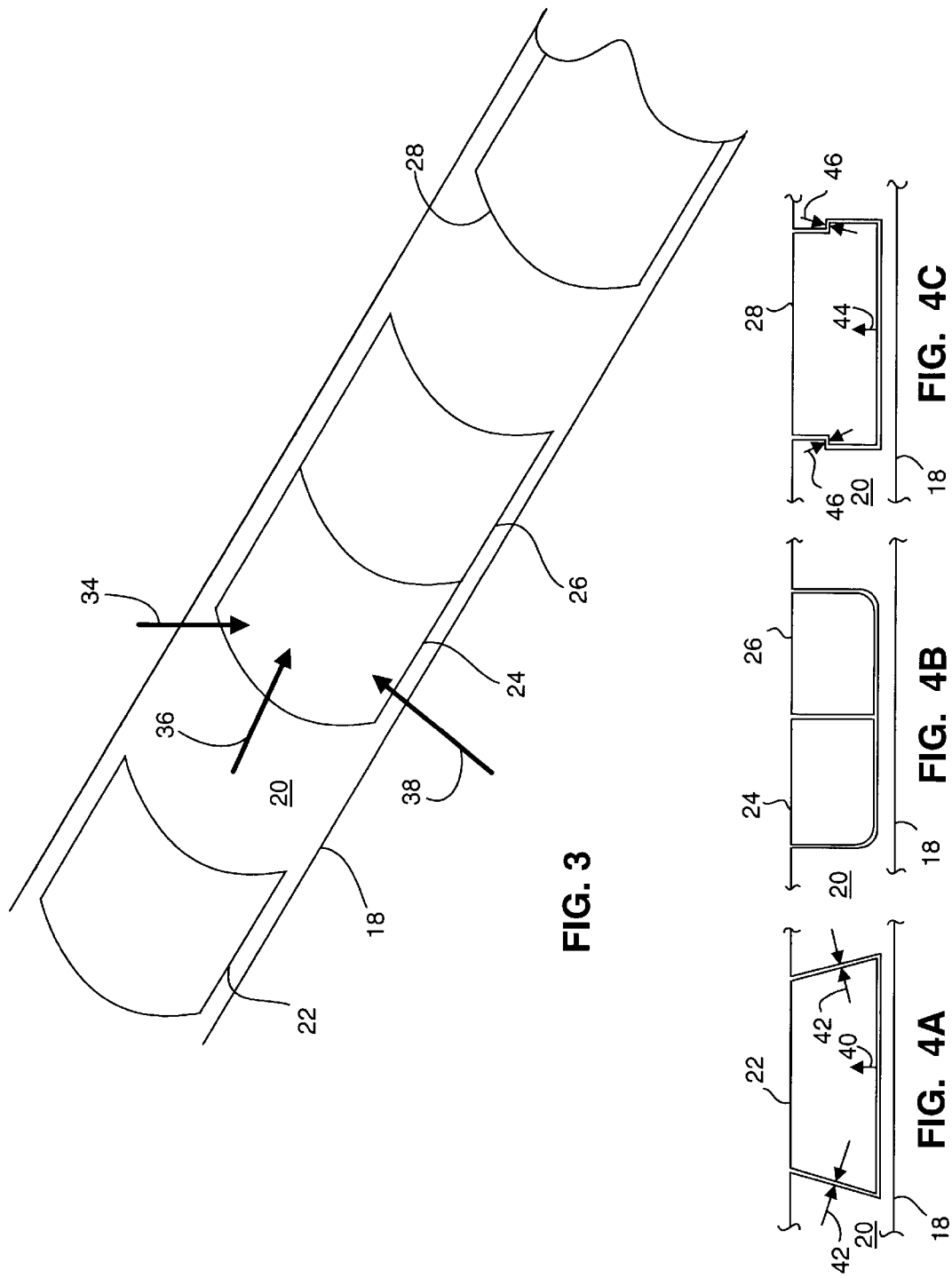

KEYBOARD HAVING BUTTONS POSITIONED FOR OPERATION BY HEEL OF HAND

RELATED APPLICATION

This application is related to the following U.S. Patent Applications, all filed May 22, 1998 and assigned to the International Business Machines Corporation of Armonk, N.Y.: "Keyboard/Wrist Rest Having Third Button for Multimode Operation," Ser. No. 09/083,639, now U.S. Pat. No. 6,188,390, issued Feb. 13, 2001; "Wrist Rest Having Buttons Positioned for Thumbs While Typing," Ser. No. 09/083,523; "Two-Handed Scrolling Mode Switch," Ser. No. 09/083,774; and "Two-Handed Scrolling Mode Switch," Ser. No. 09/538,315, filed Mar. 30, 2000, which is a divisional application of Ser. No. 09/083,774, and claims priority from May 22, 1998. The disclosures of each of the preceding applications are incorporated by reference herein as though fully set forth as of May 22, 1998. This application is also related to the following U.S. Patent Application, also assigned to the International Business Machines Corporation, Armonk, N.Y.: "Wrist Rest Cursor Control System," Ser. No. 08/568,103, which is a continuation of U.S. patent application Ser. No. 08/429,753, now abandoned.

FIELD OF THE INVENTION

The invention generally relates to information processing systems, and more specifically, to keyboard-related control buttons used with graphical user interfaces to information processing systems. The invention has a particular applicability to IBM® keyboards, computers, and the IBM Think-Pad® notebook computer. (IBM and ThinkPad are registered trademarks of the International Business Machines Corporation.)

BACKGROUND OF THE INVENTION

Many computer keyboards, both those that stand alone and those that are built in, such as in notebook computers, include pointing devices. The keyboards of many IBM computers include a TrackPoint® pointing device (TrackPoint is a registered trademark of the International Business Machines Corporation) located between keys above the space bar. Such computers include control buttons for selecting a displayed object pointed to by a displayed pointer controlled by the pointing device, for example, the left- and the right-pointer buttons. The control buttons are often located along an edge of the keyboard for operation by the thumbs while typing and while using the pointing device. In other cases the control buttons are located in a wrist rest which forms part of the keyboard or the notebook computer. But in any case the buttons are intended for operation by the thumbs or sometimes the finger tips.

For many users it would be more natural—and when the user suffers a repetitive stress injury, more comfortable—to operate a control button using the distal edge of either hand. But that is not possible with the centrally located, thumb operable control buttons now used on most computers having built in pointing devices.

What is needed is a set of control buttons operable by the outer edge of either hand.

SUMMARY OF THE INVENTION

This need, and others that will become apparent, is met by the present invention which adds an additional left- and right-control button along the edge of the keyboard and in the wrist rest area of a notebook computer. These additional control buttons duplicate the functions of the thumb operable buttons and are located and shaped such that they are natural and easy to use while typing and while using the finger tips to control the built in keyboard positioning device. The user simply presses down on the additional key with the outer edge near the heel of the hand.

BRIEF DESCRIPTION OF THE DRAWINGS

For a further understanding of the objects, features and advantages of the present invention, reference should be had to the following description of the preferred embodiment, taken in conjunction with the accompanying drawing, in which like parts are given like reference numerals and wherein:

FIG. 3 is a partial perspective view of an edge region portion of the keyboards of FIGS. 1 and 2.

FIG. 4A is a partial front view of a button shape preventing accidental dislodgment.

FIG. 4B is a partial front view of a specific embodiment of two buttons as illustrated in FIG. 1.

FIG. 4C is a partial front view showing another button shape preventing accidental dislodgment.

This application incorporates by reference the full disclosures of four patent applications claiming priority from May 22, 1998 as set forth in detail in the section entitled "Related Applications" at the beginning of this specification.

DESCRIPTION OF THE PREFERRED EMBODIMENT

Figure 1:
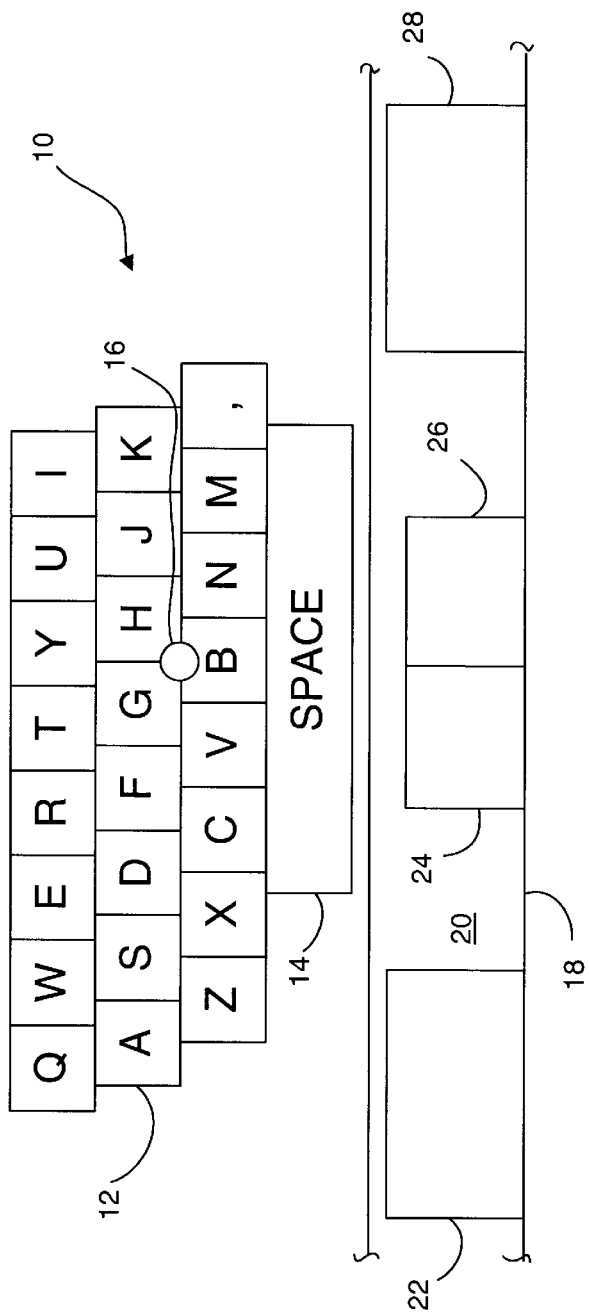
FIG. 1 is a plan view showing a keyboard having buttons positioned for operation by an outside edge of the hand.

With reference to FIG. 1 there is shown a partial plan view of a computer input device, designated generally by the reference numeral 10. The input device 10 includes a keyboard 12, a space bar 14, a pointing device 16, a keyboard edge region 18, a portion 20 of the edge region located adjacent the space bar, and operational buttons 22–28 disposed within the edge region portion 20. The operational buttons 24, 26 correspond to a left-button and a right-button, respectively, of a standard two-button pointing device. Buttons 22 and 28 are located for ease of use by a distal edge or heel of a hand while typing. Though not illustrated, the input device 10 also includes circuits for electrically connecting the keyboard 12, the pointing device 16, and the operational buttons 22–28 to an electronic assembly such as a computer or other information processing system component.

Figure 2:
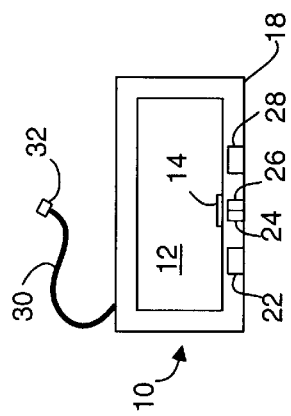
FIG. 2 is a plan view of a stand-alone keyboard having buttons positioned for operation by an outside edge of the hand.

In a specific embodiment, the edge region 18 forms a border surrounding the keyboard, as illustrated in FIG. 2, a plan view of the input device 10. As shown in FIG. 2, the input device 10 includes a cable 30 and connector 32 for electrically connecting the input device to a computer or other information processing system component.

FIG. 3 is a partial perspective view of an edge region portion 20 forming a curved surface which curves downward away from the plane of the keyboard 12. Each of the operational buttons 22–28 defines an operating surface which conforms with the curvature of the edge region portion 20. In a specific embodiment, the operational buttons 22–28 are operable by pressing the button operating surface in any direction. Pressing downward, as indicated by the direction of arrow 34 for example, will operate the button 24. Pressing at an oblique angle, as indicated by the direction of the arrow 36, will operate the button 24. Pressing forward parallel to the plane of the keyboard, as indicated by the direction of the arrow 38, will operate the button 24. Such buttons are operable by applying a force normal to any portion of the button operating surface.

FIGS. 4A, 4B, and 4C are partial front views of the edge region portion 20 illustrating a variety of button shapes and conforming edge region portion openings.

FIG. 4A illustrates a trapezoidal button shape in which the width of the button increases as the button operating surface follows the curve of the edge region portion in a downward direction. Note in particular that an upward force (arrow 40) applied along the lower edge of the button will cause the inwardly sloping side edges of the button to wedge (arrows 42) against the corresponding side edges of the opening, thus preventing the button from being accidentally dislodged from its protective covering 20.

FIG. 4B illustrates straight-edged buttons 24, 26 which, though pleasing in appearance and operating satisfactorily, do not provide protection against accidental dislodgment.

FIG. 4C illustrates an alternative to the trapezoidal shape. Here the button 28 is wider at the lower front edge than at the top, and provides protection against accidental dislodgment. An upward force (arrow 44) applied along the lower edge of the button will cause a ledge of the button to wedge (arrows 46) against an overhang of the opening, preventing an accidental dislodgment of the button 28 from its protective covering 20.

Figure 5:
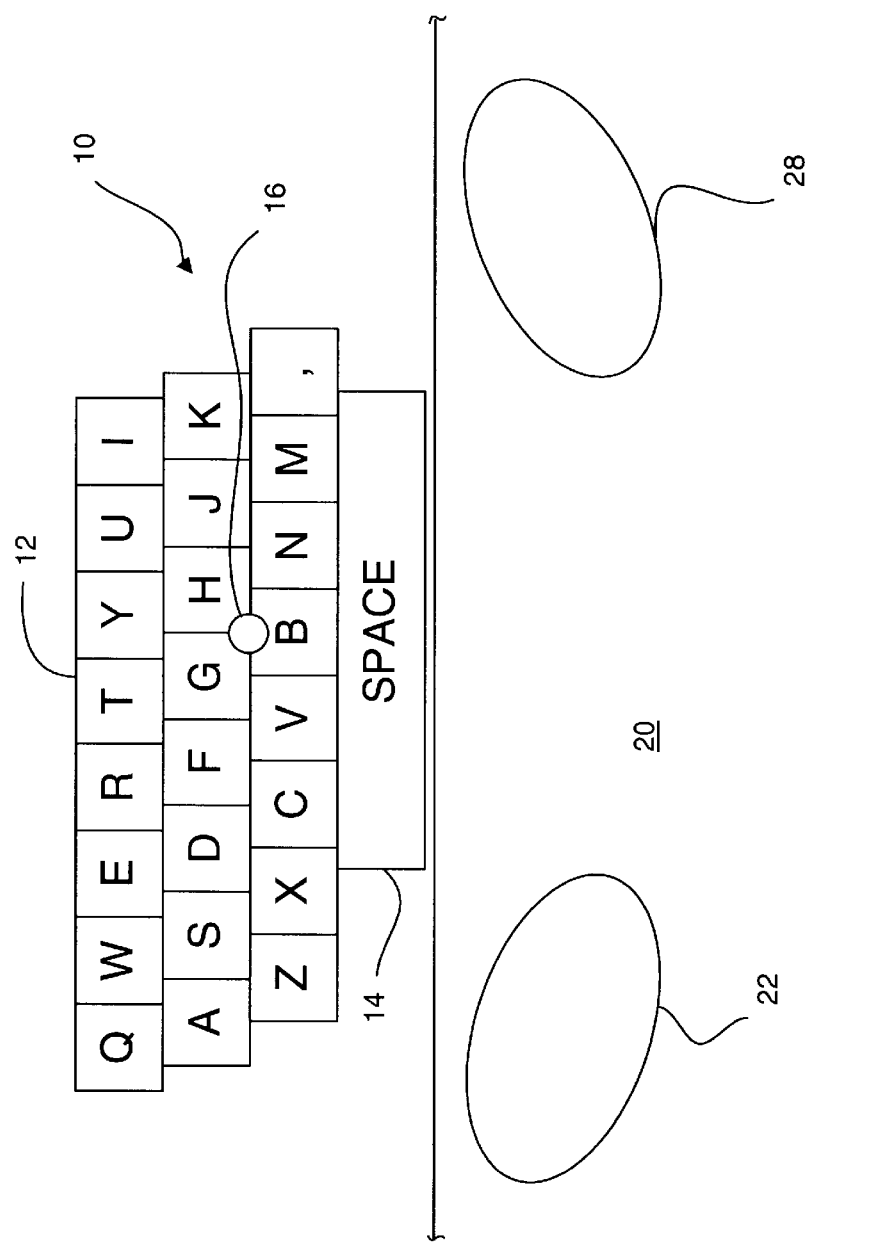
FIG. 5 is a plan view illustrating a notebook computer wrist rest having buttons positioned for operation by an outside edge of the hand.

Finally, FIG. 5 is a partial plan view of the computer input device 10, illustrating an edge region portion 20 which has been extended to provide a wrist rest area. The two buttons 22, 28 are positioned for operation by a distal edge of the heel of the hand while typing and while using the finger-tip control pointing device 16. In a specific embodiment, the input device 10 forms a stand-alone keyboard device having a wrist rest area. The stand-alone device includes a cable and connector (30 and 32 of FIG. 2) for making an electrical connection between the keyboard, the pointing device and the buttons and a computer or other information processing system component. In a different specific embodiment, the input device 10 forms a portion of a portable computer or other information processing system component.

While the invention has been described in relation to the embodiments shown in the accompanying Drawing figures, other embodiments, alternatives and modifications will be apparent to those skilled in the art. It is intended that the Specification be exemplary only, and that the true scope and spirit of the invention be indicated by the following Claims.

What is claimed is:

1. A computer input device, comprising:
   a keyboard including a space bar and keys for typing;
   a pointing device located within the keyboard;
   the space bar having first and second ends;
   an edge region located outside the keyboard and having a portion adjacent the keyboard space bar;
   a plurality of operational buttons disposed within the edge region portion;
   at least one of said operational buttons in said edge region portion being laterally displaced sufficiently beyond an end of the spacebar to permit a user, while the user is typing with the keys, to use a heel of his hand to operate said at least one operational button; and
   means for electrically connecting the keyboard, the pointing device, and the operational buttons to an electronic assembly, wherein said plurality of operational buttons within said edge region portion includes left- and right-operational buttons for operation by the thumbs while typing.

2. The input device as set forth in claim 1, wherein the edge region forms a border surrounding the keyboard.

3. The input device as set forth in claim 1, wherein the edge region portion forms a curved surface that curves downward away from the plane of the keyboard, and each button has an operating surface which conforms with said curved surface.

4. The input device as set forth in claim 3, wherein at least one button is operable by applying a force normal to any portion of its operating surface.

5. The input device as set forth in claim 4, further including the operating surface of the at least one button extending through an opening in the edge region portion, and the button operating surface and the opening shaped to prevent an accidental dislodgment of the button from the edge region.

6. The input device as set forth in claim 5, wherein the shape is trapezoidal, being wider at the base than at the top.

7. The input device as set forth in claim 5, wherein the shape is a compound rectangle, having a wider rectangle at the base and a narrower rectangle at the top.

8. The input device as set forth in claim 1, wherein the edge region portion defines a wrist rest.

9. The input device as set fort in claim 8, wherein one button is located on the wrist rest, laterally displaced beyond a left end of the space bar, for operation by the heel of the left hand while typing, and another button is located on the wrist rest, laterally displaced beyond a right end of the space bar, for operation by the heel of the right hand while typing.

10. A keyboard input system having buttons, the buttons being operable by a heel of the hand while typing and while using a pointing device, the system comprising:
    a keyboard having a pointing device located within the keyboard, a space bar having first and second ends, and keys for typing;
    an edge region located outside the keyboard;
    at least one control button located within the edge region, said at least one control button being laterally displaced sufficiently beyond an end of the space bar to permit a user, while the user is using the pointing device and typing with the keys, to use a heel of his hand to operate said at least one control button; and
    means for electrically connecting the keyboard, the pointing device and said at least one, control button to a computer or other information processing system, wherein said at least one control button includes left- and right-control buttons located within the edge region for operation by the thumbs while typing and while using the pointing device.

11. The input system as set forth in claim 10, wherein the pointing device is an isometric pointing device.

12. The input system as set forth in claim 11, wherein the isometric pointing device is a TrackPoint pointing device.

13. The input system as set forth in claim 10, wherein said at least one control button further includes two control buttons located within the edge region for operation by the heels of the hands, a first of said buttons duplicating the functions of the left-control button and being laterally displaced sufficiently beyond a left end of the space bar to permit option by the heel of the left hand while typing an while using the pointing device, and the other of said buttons duplicating the functions of the right-control button and being laterally displaced sufficiently beyond a light end of the space bar to permit operation by the heel of the right hand while typing and while using the pointing device.

* * * * *

UNITED STATES PATENT AND TRADEMARK OFFICE
CERTIFICATE OF CORRECTION

PATENT NO.   : 6,614,421 B1
DATED        : September 2, 2003
INVENTOR(S)  : Edwin Joseph Selker, Barton Allen Smith and Todd Clossen Wyant It is certified that error appears in the above-identified patent and that said Letters Patent is hereby corrected as shown below:

<u>Column 4,</u>
Line 54, delete the comma that appears in the phrase "at least one, control button"

<u>Column 5,</u>
Line 3, delete "an" and replace it with -- and --

<u>Column 6,</u>
Line 1, delete "light" and replace it with -- right --

Signed and Sealed this

Fourth Day of May, 2004

JON W. DUDAS
*Acting Director of the United States Patent and Trademark Office*